Aug. 25, 1925.
W. H. WARD
CULTIVATOR
Filed Nov. 3, 1924
1,551,350
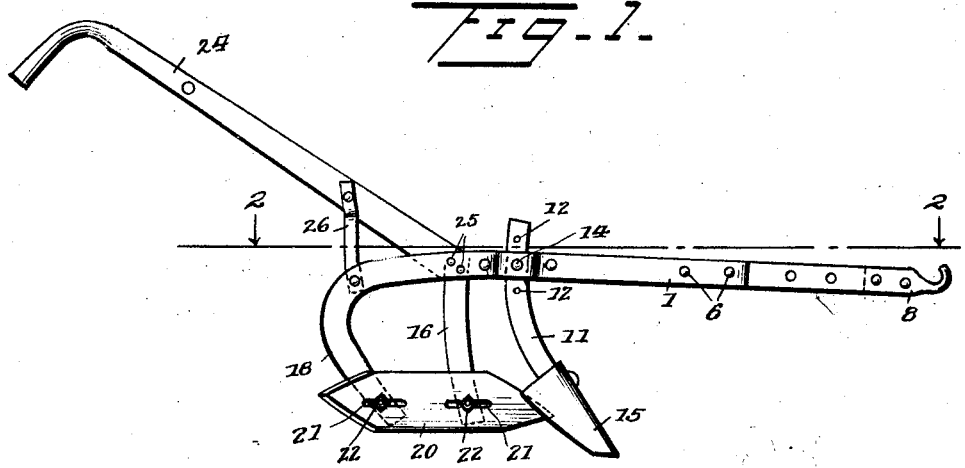
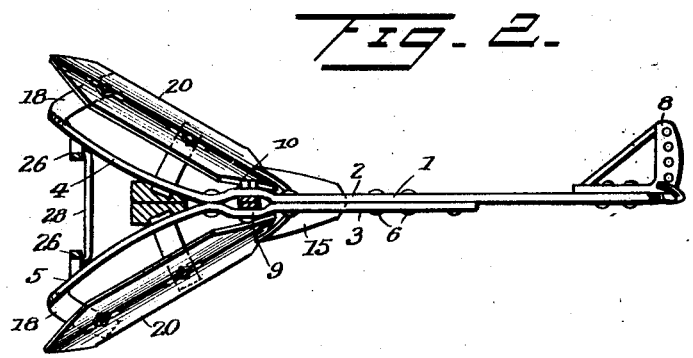
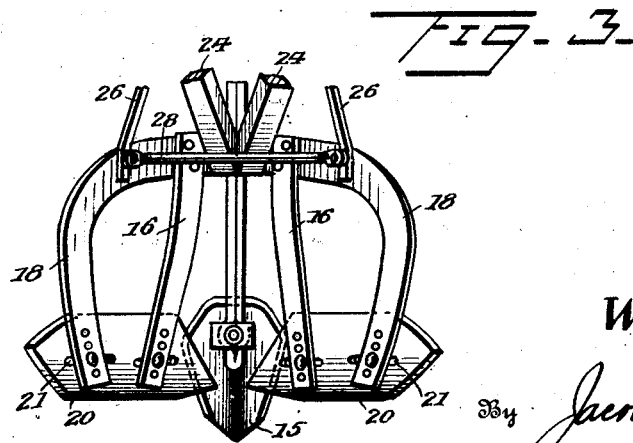
Inventor
Wm. H. Ward.
By Jacobi & Jacobi
Attorneys Patented Aug. 25, 1925.

1,551,350

UNITED STATES PATENT OFFICE.

WILLIAM H. WARD, OF HUNTSVILLE, TEXAS, ASSIGNOR OF ONE-THIRD TO ROAN G. McINTYRE, OF WILLIS, TEXAS.

CULTIVATOR.

Application filed November 3, 1924. Serial No. 747,584.

*To all whom it may concern:*

Be it known that WILLIAM H. WARD, a citizen of the United States, residing at Huntsville, in the county of Walker and State of Texas, has invented certain new and useful Improvements in Cultivators, of which the following is a specification.

This invention relates to new and useful improvements in cultivators and has for its principal object to provide a device which is especially adapted for use in the cultivation of growing plants, wherein the device is adapted to straddle the row in such a manner as to have the actuating means on opposite sides of the row, whereby the proper ridging may be accomplished.

Another important object of the present invention is to provide a cultivator of the above mentioned character, wherein means is provided for guiding the cultivator during the operation thereof when in use.

A still further object of the invention is to provide a cultivator of the above mentioned character, wherein the scraper blades may be detachably and adjustably supported in position on opposite sides of the row, and wherein means is associated with the blades for preventing the lateral movement of the same when the device is in use.

A still further object of the invention is to provide a cultivator which is simple in construction, inexpensive, strong and durable and further well adapted for the purposes for which it is designated.

Other objects and advantages of this invention will become apparent during the course of the following description.

In the accompanying drawing forming a part of the specification and in which like numerals of reference designate like parts throughout the same,—

Figure 1 is a side elevation of the cultivator constructed in accordance with my invention.

Figure 2 is a top plan and partial sectional view on the line 2—2 of Figure 1, and Figure 3 is a rear elevation of the cultivator.

In the accompanying drawing wherein for the purpose of illustration is shown the preferred embodiment of my invention, the numeral 1 designates generally a beam which comprises the complementary sections 2 and 3 respectively, the latter having their rear end portions 4 and 5 diverging outwardly, thus providing a substantially Y-shaped frame. The forward portions of the complementary sections of the beam are secured together in any suitable manner as by bolts such as shown at 6 in the drawing, a portion of the section 2 extending beyond the section 3 and supporting the draft connecting device 8. As the latter is of any well known construction and is furthermore well known in the art it is not thought necessary to go further into detail relative the same.

Adapted to be detachably and adjustably supported between spaced portions 9 of the complementary sections 2 and 3 adjacent the forked portion 10 of the Y-shaped frame is the plow foot 11. The plow foot may have its shank provided with a series of spaced apertures 12 for the purpose of permitting the vertical adjustment thereof in the beam and the same is adapted to be supported in the proper adjusted position by means of the transversely extending bolt or pin 14, the latter extending through registering apertures provided in the complementary spaced sections of the beam. The lower portion of the plow foot 11 supports thereon the plow 15 in the usual manner, and the use thereof is also well known in the art.

Secured at their upper ends to the outwardly diverging portions 4 and 5 of the complementary sections 2 and 3 respectively, are the supporting standards 16 and 18 respectively, a pair of these standards being provided for each outwardly diverging portion in such a manner as to have one pair of the supporting standards adjacent the forked portion 10 and the other pair of standards adjacent the rear or outer end of the outwardly diverging portions in the manner as clearly illustrated in Fig. 2 of the drawing.

As more clearly shown in Figures 1 and 3, it will be observed that the supporting standards 18 are formed by integral downwardly extending portions at the rear of the divergent members 4 and 5 respectively, this arrangement affording a sturdier, stronger and cheaper construction.

The supporting standards extend downwardly from the outwardly diverging portions of each of the sections of the beam in the manner described and adapted to be adjustably and detachably supported on the lower ends of each pair of the same is the scraper blade 20. Each of the latter is provided with a pair of elongated apertures 21 for permitting the longitudinal adjustment of each blade and the ends of the blades are pointed. Suitable bolts such as are shown at 22 in the drawing are provided for permitting the blades to be properly supported and adjusted on the lower extremities of the supporting standards. With the blades arranged as shown in Fig. 2 of the drawing it will be seen that they extend in substantially the same plane and in the same manner as the outwardly diverging portions 4 and 5 respectively. This construction enables the blades to extend on opposite sides of the row in which the cultivator is traveling and permits the scraper blades to properly move along the ground, thus scraping the surface adjacent the furrow and producing the desired ridging, at the same time removing the weeds which may be growing at the points or places where the plants are growing.

Extending rearwardly from the forked portion of the Y-shaped beam are the handles 24 which are of the conventional construction and are secured to the inner side faces of the outwardly diverging portions 4 and 5 respectively adjacent the forked portion 10 by means of the bolts 25. Suitable braces or the like such as are shown at 26 in the drawing extend from the intermediate portions of the handles 24 to the outwardly diverging portions 4 and 5 and are provided for the purpose of preventing any relatively loose movement of the handles. An additional brace 28 extends across the outer free ends of the outwardly diverging portions 4 and 5 and is secured at its respective ends to the supporting standards in the manner as shown in the drawing.

With a device of the above mentioned character the proper ridging of the earth on both sides of a row of growing plants will be obtained, the plow which is mounted on the cultivator being adapted to pulverize the soil without injuring the growing plants and the scraper blades being used to remove the weeds and the like. The guide means further enable the proper movement of the cultivator and prevent any injury to the plants.

The simplicity of my device enables the same to be easily and quickly adjusted to the desired positions and furthermore may be manufactured at a minimum cost.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim is:—

1. A cultivator of the class described comprising a substantially Y-shaped beam, a plow foot adjustably supported on said beam adjacent the forked portion thereof, a forward and rear pair of supporting standards extending downwardly from the shorter arms of said Y-shaped beam, the rear pair of standards being formed by an integral downward extension of said shorter arms, scraper blades longitudinally adjustably supported on the lower portions of said standards, and handles extending rearwardly from the forked portion of said beam and secured at their inner ends to the shorter arms.

2. A cultivator of the class described comprising a beam including a pair of complementary sections having their rear ends diverging outwardly to provide a substantially Y-shaped member, a plow foot adjustably supported on said beam adjacent the forked portion thereof, supporting standards secured at their upper ends to the outwardly diverging portions, scraper blades adjustably mounted on the lower ends of said standards, handles secured at their inner ends to the inner sides of said outwardly diverging portions adjacent the forked portion of said Y-shaped beam, and bracing means interconnecting said handles with said Y-shaped beam, and the members of said Y-shaped beam with each other.

3. A cultivator of the class described comprising a beam including a pair of complementary sections having their rear ends diverging outwardly to provide a substantially Y-shaped member, a plow foot adjustably supported on said beam adjacent the forked portion thereof, forward and rear supporting standards secured at their upper ends to the outwardly diverging portions, the rear standards being formed by integral downward extensions of said Y-shaped member, scraper blades adjustably mounted on the lower ends of said standards, handles secured at their inner ends to said outwardly diverging portions, and a brace extending across the outer free ends of said outwardly diverging portions, and bracing means interconnecting said handles with said Y-shaped beam, and the members of said Y-shaped beam with each other.

In testimony whereof I affix my signature.

WILLIAM H. WARD.